G. W. COMBS.
GYRATORY STRUCTURE.
APPLICATION FILED MAR. 1, 1910.
1,123,169.
Patented Dec. 29, 1914.
2 SHEETS—SHEET 2.
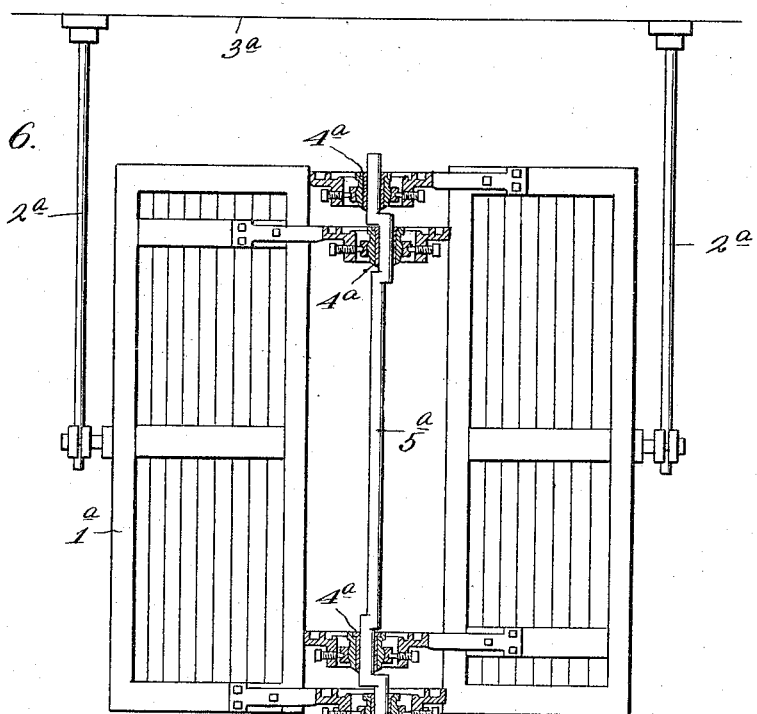
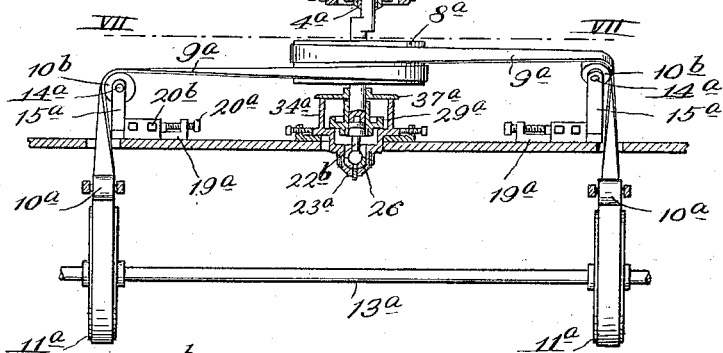
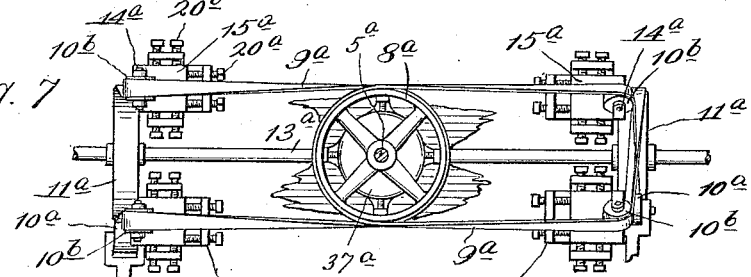
WITNESSES:
R. E. Hamilton
M. Cox.
INVENTOR.
George W. Combs,
BY F. G. Fischer,
ATTORNEY.

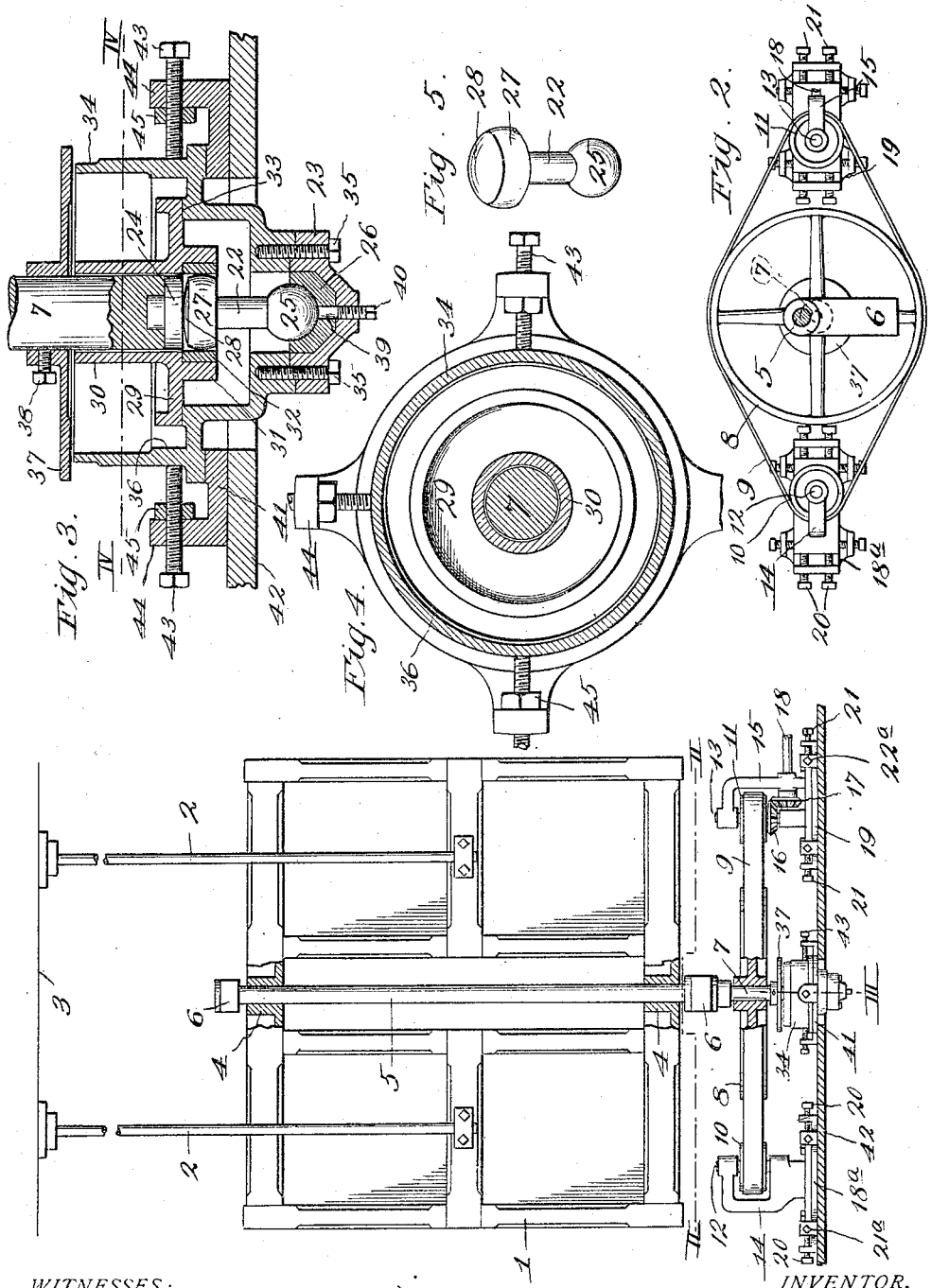

UNITED STATES PATENT OFFICE.

GEORGE W. COMBS, OF LEAVENWORTH, KANSAS.

GYRATORY STRUCTURE.

1,123,169.   Specification of Letters Patent.   Patented Dec. 29, 1914.

Application filed March 1, 1910. Serial No. 546,668.

*To all whom it may concern:*

Be it known that I, GEORGE W. COMBS, a citizen of the United States, residing at Leavenworth, in the county of Leavenworth and State of Kansas, have invented certain new and useful Improvements in Gyratory Structures, of which the following is a specification.

This invention relates to improvements in self-balancing gyratory structures, such as flour sifters, etc., and one of my objects is to support the structure-shaft and parts affixed thereto by antifrictional means independent of the structure, so that said shaft may be free to move laterally in any direction and the bearings of the structure relieved of the weight of the shaft and the parts carried thereby.

A further object is to overcome excessive throw of the structure when starting or stopping, and also after said structure has attained normal speed, to the end that vibration may not be imparted to the building containing the structure.

Other objects of the invention will hereinafter appear, and in order that said invention may be fully understood, reference will now be made to the accompanying drawings, in which:

Figure 1 shows a gyratory structure provided with my improvements. Fig. 2 is a horizontal section on line II—II of Fig. 1. Fig. 3 is an enlarged vertical section on line III of Fig. 1. Fig. 4 is a horizontal section on line IV—IV of Fig. 3. Fig. 5 is a detail of an antifrictional supporting member, forming an important feature of the invention. Fig. 6 shows a modified form of the invention, and Fig. 7 is a horizontal section on line VII—VII of Fig. 6.

1 designates a sieve-structure or body freely supported for gyration by flexible rods 2, depending in the present instance from a ceiling 3. Structure 1 is provided with centrally-disposed bearings 4, in which a vertically-positioned shaft 5 is journaled. Shaft 5 is freely mounted in the bearings 4 so that it will not be lifted from an antifrictional supporting member, hereinafter described, when the structure swings outward and upward into its gyratory course.

6 designates a pair of eccentric-weights fixed to shaft 5 to assist the latter in imparting a gyratory motion to the structure when the shaft is rotated.

7 designates an eccentric-pin secured to the lower end of shaft 5 and provided with a fixedly-mounted driver 8, which together with said pin is capable of orbital movement.

9 designates an endless belt extending around a small pulley 10 and a small pulley 11, fixed to vertical stub-shafts 12 and 13, journaled in bearings 14 and 15, respectively. Shaft 13 is provided with a bevel gear wheel 16 driven by a bevel gear wheel 17 fixed upon a driven shaft 18, mounted in bearing 15. Bearings 14 and 15 are adjustably mounted upon bed-plates 18$^a$ and 19, provided with screws 20 and 21, respectively, whereby said bearings may be adjusted either toward or away from each other for the purpose of tensioning belt 9, whereby pulley 8 is driven, and the structure restrained from abnormal throw while in operation. Bearings 14 and 15 are also laterally-adjustable upon the bed-plates 18$^a$ and 19, which are provided with set-screws 21$^a$ and 22$^a$, respectively, for effecting said lateral adjustment.

22 designates the antifrictional supporting member, above referred to, which carries the weight of the shaft and the parts affixed thereto independently of the structure 1, and thereby relieves the bearings of the latter of the wear and strain which would result from carrying the shaft and the eccentric weights. Member 22 is supported at its lower end in a step-bearing 23, and normally extends in axial alinement with eccentric-pin 7, which rests thereon, as shown in Fig. 3, a hardened steel button 24 being interposed between the upper end of the antifrictional member and the lower end of the eccentric-pin to protect the latter from wear. The lower portion 25 of member 22 is of spherical form, and is seated within a socket-member 26 within the step-bearing so that said member 22 may oscillate freely in any direction, should eccentric-pin 7 move laterally, or so that the upper portion of said member 22 may move orbitally with the pin, should the structure leave its true gyratory course. The upper portion of member 22 is provided with a circular head 27 having a convex upper surface 28, so that it will have a rolling contact with the lower end of the eccentric-pin 7, carried thereby. The curvature of the covex upper surface 28 of member 22 is such that the eccentric-pin 7 will be maintained on, substantially, the same horizontal plane notwithstanding the inclination of member 22 when moving laterally with said eccentric-pin.

The lower end of eccentric-pin 7 and the upper end of member 22 are held in proper relation to each other by a roller 29, having an upwardly-extending hub 30, loosely-embracing the lower portion of the eccentric-pin, and a depending boss 31 embracing the upper portion of member 22, as shown in Fig. 3. Boss 31 is protected from wear by a hardened steel annulus 32, driven therein and loosely-engaging the convex periphery of head 27 of member 22. Roller 29 is supported upon an annular horizontal face 33 within a lubricant chamber 34 containing the lower end of eccentric-pin 7, member 22, and roller 29, said lubricant chamber being closed at its lower end by the step-bearing 23 which is secured thereto by machine screws 35. Roller 29 is of less diameter than the interior of the lubricant chamber to allow lateral movement of eccentric-pin 7 in any direction, but is adapted to contact with and roll on a vertical circular face 36 within the lubricant chamber and thus positively limit the lateral movement of said pin. This arrangement of the roller 29 and face 36 reduces to a minimum shock and friction incident to the roller contacting with said face. Dust is excluded from the interior of the lubricant chamber by a lid or cover 37 fixed to the eccentric-pin 7 by a set-screw 38, so that it will not scrape upon the upper edge of the lubricant chamber when moving laterally with said pin. However, should dust or other foreign matter enter the lubricant chamber, it may be readily flushed out through an orifice 39 extending through the bottom of socket-member 26 and the step-bearing 23, and normally closed by a screw-plug 40 to retain the oil within the lubricant chamber.

41 designates a base-plate secured to the floor 42 of the building to support the lubricant chamber 34, which is adjusted concentrically to pin 7 by means of set-screws 43, extending through upturned lugs 44 on the base-plate, and secured from accidental movement by lock-nuts 45.

In the modified form shown in Figs. 6 and 7, the construction and operation of the parts is similar to that shown in Figs. 1 to 5, inclusive, and in order that said modified form may be fully understood, I will now proceed to describe the same in detail. $1^a$ designates the gyratory structure, which in the present instance is of the four-box type disclosed by U. S. Letters Patent No. 12,894 (reissue). $2^a$ designates suspending rods for the structure, which depend from the ceiling $3^a$. The sieve-boxes are connected in pairs by diagonal bridge-trees having bearings $4^a$ in which a crank-shaft $5^a$ is journaled, said crank-shaft being provided with a driver $8^a$ fixed thereto. Driver $8^a$ is driven and the structure is restrained from abnormal throw by two endless members $9^a$ extending in opposite directions from driver $8^a$ to a pair of pulleys $11^a$, fixed to a rotary shaft $13^a$. The endless members $9^a$ run over idlers $10^a$ and $10^b$, which latter are mounted upon shafts $14^a$, mounted in bearings $15^a$, adjustably-mounted upon bed-plates $19^a$. Bed-plates $19^a$ are provided with set-screws $20^a$ and $20^b$ to adjust bearings $15^a$ longitudinally and laterally, respectively. Shaft $5^a$ is supported upon an antifrictional member $22^b$ freely-mounted in a step-bearing $23^a$, provided with a socket-member $26^a$, in which the lower spherical end of member $22^b$ is operatively-seated. The step-bearing $23^a$ is secured to the lower end of a lubricant-chamber $34^a$, into which the lower end of the shaft extends, said lubricant-chamber being closed by a lid $37^a$ movable thereon. $29^a$ designates a roller loosely-embracing the lower end of the shaft and holding the same in proper relation to the upper end of member $22^b$. Roller $29^a$ is of less diameter than the interior of the lubricant-chamber so that it may move laterally in any direction with shaft $5^a$, but is adapted to positively limit said lateral movement by contacting with the interior of the chamber.

Having thus described my invention, what I claim is:—

1. In combination, a gyratory structure, a shaft thereto capable of lateral and orbital movement, an antifrictional support for said shaft capable of moving therewith and antifrictional means to limit the movement of said support.

2. In combination, a freely suspended structure, a shaft thereto capable of lateral and orbital movement, and an antifrictional support for said shaft independent of the structure and capable of moving at its upper end with the shaft.

3. In combination, a gyratory structure, a shaft thereto capable of lateral and orbital movement, and antifrictional means for supporting said shaft, said means being capable of both oscillatory and orbital movement.

4. In combination, a gyratory body, a shaft thereto capable of lateral and orbital movement, a support for said body independent of the shaft, and a member for supporting said shaft, said member having a ball-and-socket connection at one end but free to move in any direction at its opposite end.

5. In combination, a gyratory structure, a shaft for actuating the same, and means for supporting said shaft, said means being fixed from lateral movement at one end but rockingly-engaging the shaft at its opposite end.

6. In combination, a structure, means freely-suspending the same, a journaled shaft therein capable of lateral but not oscillatory movement, and supporting means for said shaft normally and axially in alinement with the axis of rotation but capable of swinging at an angle thereto.

7. In combination, a gyratory structure, a shaft for actuating said structure capable of lateral movement in any direction, and an antifrictional supporting member capable of moving with the shaft and independent of the structure, said member having a convex upper terminal upon which the shaft is carried.

8. In combination, a gyratory body, a shaft for actuating the same capable of lateral movement in any direction, a lubricant chamber into which the lower end of said shaft extends, and a roller in the lubricant chamber surrounding the shaft, said roller being free to move laterally to a limited extent within the lubricant chamber but adapted to contact with the interior thereof and thereby form a check to the lateral movement of the shaft.

9. In combination, a gyratory body, a shaft for actuating the same capable of lateral movement in any direction, a lubricant chamber into which the lower end of said shaft extends, said lubricant chamber having an interior horizontal face, and a roller supported by said face and loosely-embracing the shaft, said roller being free to move over its support and engage the interior of the lubricant chamber to limit the lateral movement of the shaft.

10. In combination, a gyratory structure, a shaft for actuating the same, a lubricant chamber into which the lower end of the shaft extends, a support within said lubricant chamber, for the shaft, and means for adjusting said lubricant chamber laterally.

11. In combination, a gyratory structure, an eccentrically-weighted shaft for actuating the structure, said shaft being capable of lateral movement in any direction, and an antifrictional support for said shaft capable of moving therewith.

12. In combination, a gyratory body, a shaft for actuating said body, a pin arranged eccentrically to said shaft and supporting the weight thereof, said pin being capable of lateral movement in any direction, and a supporting member for said pin, said member being capable of swinging in any direction and having a convex upper surface whereby the pin is maintained on the same horizontal plane during lateral movement notwithstanding the swinging of said supporting member.

13. In combination, a gyratory body, a shaft for actuating the same capable of lateral movement in any direction, a lubricant chamber into which the lower end of said shaft extends, and rotary means embracing the shaft and adapted to contact with the interior of said lubricant chamber to limit lateral movement of the shaft.

14. In combination, a gyratory structure, a shaft journaled in said structure to actuate the same, a support for said shaft embracing a spherical lower portion and a circular head, and a socket member freely engaging said spherical lower portion.

15. In combination, a gyratory structure, a shaft journaled in said structure to actuate the same, a support for said shaft capable of lateral and orbital movement, a member holding said support in proper relation to the shaft, said member being capable of moving laterally and orbitally therewith, and means to limit the movement of said member.

16. In combination, a gyratory structure, a shaft journaled in said structure to actuate the same, a support for said shaft capable of moving laterally and orbitally therewith, a member having a hub loosely embracing the shaft and a boss loosely embracing the supporting member to hold the latter in proper relation to the shaft, and means to limit the movement of said member.

17. In combination, a gyratory structure, a shaft journaled in said structure to actuate the same, a support for said shaft capable of lateral and orbital movement therewith, a roller loosely embracing the shaft and its support to hold them in proper relation to each other, a lubricant chamber having a face portion over which said roller may slide and an annular wall to limit lateral and orbital movement of said roller, and a driver for the shaft.

In testimony whereof I affix my signature, in the presence of two witnesses.

GEORGE W. COMBS.

Witnesses:
T. J. SMEDDICK,
G. H. SHUDENBERGEN.

Copies of this patent may be obtained for five cents each, by addressing the "Commissioner of Patents, Washington, D. C."